(12) United States Patent
Yang et al.

(10) Patent No.: US 7,227,334 B2
(45) Date of Patent: Jun. 5, 2007

(54) CHARGING APPARATUS USED WITH A MOBILE ROBOT

(75) Inventors: Soo-Sang Yang, Suwon (KR); Youn-Baek Lee, Suwon (KR); Yeon-Taek Oh, Yongin (KR); Ja-Woo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 10/749,394

(22) Filed: Jan. 2, 2004

(65) Prior Publication Data

US 2005/0083011 A1 Apr. 21, 2005

(30) Foreign Application Priority Data

Oct. 21, 2003 (KR) ............ 10-2003-0073327

(51) Int. Cl.
*H02J 7/00* (2006.01)
*H01R 13/24* (2006.01)
*H01R 13/64* (2006.01)

(52) U.S. Cl. ............ 320/107; 439/700; 439/246; 439/247; 439/248

(58) Field of Classification Search ............ 320/107, 320/114, 115; 439/374, 700, 247, 248
See application file for complete search history.

(56) References Cited

U.S. PATENT DOCUMENTS 5,892,350 A * 4/1999 Yoshikawa ............ 320/107

FOREIGN PATENT DOCUMENTS

| JP | 08-083125 | 3/1996 |
| JP | 2002-325707 | 11/2002 |
| JP | 2002-370182 | 12/2002 |

* cited by examiner

*Primary Examiner*—Karl Easthom
*Assistant Examiner*—Yalkew Fantu
(74) *Attorney, Agent, or Firm*—Stanzione & Kim, LLP (57) ABSTRACT

A charging apparatus used with a mobile robot has an improved charging structure so that a mobile robot is easily brought into electrical contact with a charging unit, thereby reducing manufacturing costs and preventing a charging failure. The charging unit is provided with a plurality of charging terminals which are brought into electrical contact with corresponding ones of contact terminals of the mobile robot. Each of the charging terminals includes a body and a head. A contact plate is mounted to a predetermined portion of the head to be brought into electrical contact with a corresponding one of the contact terminals.

30 Claims, 8 Drawing Sheets

CHARGING APPARATUS USED WITH A MOBILE ROBOT

CROSS-REFERENCE TO RELATED APPLICATIONS

This application claims the benefit of Korean Patent Application No. 2003-73327, filed Oct. 21, 2003 in the Korean Intellectual Property Office, the disclosures of which are incorporated herein by reference.

BACKGROUND OF THE INVENTION

1. Field of the Invention

The present invention relates to a charging apparatus used with a mobile robot and, more particularly, to a charging apparatus used with a mobile robot to recharge the mobile robot.

2. Description of the Related Art

Generally, mobile robots have been used in various industrial fields to maneuver elements or working tools, which are required to manufacture products, to desired positions.

Recently, there is a growing tendency to increase use of the mobile robots at home as well as in the industrial fields. At home, the mobile robot is used to clean a room, guard a user against attack, and protect the user's property.

The mobile robot is designed to fulfill given functions and missions within a scope of activity. Thus, the mobile robot is constructed to detect a moving direction and position thereof within the scope of activity. Further, the mobile robot has a rechargeable battery therein to supply electricity to various driving units including a motor to drive wheels of the mobile robot.

When the electricity available in the rechargeable battery falls below a predetermined level, the mobile robot moves to a charging unit to charge the rechargeable battery of the mobile robot. Generally, the mobile robot transceives signals with the charging unit and moves to a position adjacent to the charging unit. Thereafter, the mobile robot moves to be in contact with the charging unit, thereby forming an electrical contact between the rechargeable battery and the charging unit.

When the mobile robot moves to be in contact with the charging unit, a position error may occur due to obstacles disposed on a support surface between the mobile robot and the charging unit, or friction between the wheels and the support surface. At this time, the mobile robot fails to be in electrical contact with the charging unit. In this case, the mobile robot must move forward, backward, leftward, and rightward so as to be in electrical contact with the charging unit. The mobile robot repeats such trial and error until the electrical contact is successfully established. Thus, it takes a long time to charge the mobile robot, and further there may occur a failure to incompletely charge the rechargeable battery.

To solve the above problems, a method of installing a lamp in the charging unit to emit light has been proposed. Thus, the mobile robot moves to an electric contact (connection) position in response to the light emitted from the lamp. The above method has a problem in that the trial and error is only reduced while the failure of an electrical connection (contact) occurs frequently because the mobile robot approximately detects the electrical contact position. Therefore, the above conventional method is not practical.

To reduce the frequency of the failure of the electrical connection, there also has been proposed the charging unit and the mobile robot having an expensive guide unit. Because the mobile robot is controlled by the guide unit, the mobile robot comes into electrical contact with the charging unit at a higher rate. However, this conventional method of using the guide unit also has a problem in that it is uneconomical because the guide unit is expensive.

SUMMARY OF THE INVENTION

Accordingly, it is an aspect of the present invention to provide a charging apparatus used with a mobile robot, which has an improved charging structure, to allow the mobile robot to be in electrical contact with a charging unit efficiently, thereby reducing manufacturing costs and preventing a charging failure.

Additional aspects and/or advantages of the invention will be set forth in part in the description which follows and, in part, will be obvious from the description, or may be learned by practice of the invention.

The foregoing and/or other aspects of the present invention are achieved by providing a charging apparatus having a charging unit used with a mobile robot. The mobile robot has a rechargeable battery and a plurality of contact terminals. The charging unit includes a plurality of charging terminals which are brought into electrical contact with corresponding ones of the contact terminals of the mobile robot, thus supplying a charging current to the rechargeable battery of the mobile robot. Each of the charging terminals includes a body and a head movably coupled to the body. A contact plate is mounted on a predetermined portion of the head to be brought into electrical contact with an associated one of the contact terminals of the mobile robot.

According to an aspect of the invention, the plurality of charging terminals may be arranged in a plurality of rows.

In another aspect of this embodiment, each of the charging terminals may further include a support shaft which supports the body, and an elastic member which restores the body to an original position thereof.

In yet anther aspect of this embodiment, the body may include a groove, from which the head extends to be integrated with the body in a single structure.

In still another aspect of this embodiment, an electrical connecting member may be embedded in the body and the head to electrically connect the contact plate to an electric cable extending from a terminal mounting board of the charging unit.

In yet another aspect of this embodiment, the charging apparatus may further include a coupling unit to couple the body to the head.

In still another aspect of this embodiment, the coupling unit may be a metal plate, a metal pin, or a coupling rod which has a ball at an end thereof.

The foregoing and/or other aspects of the present invention may also be achieved by providing a charging apparatus used with a mobile robot having a rechargeable battery and a contact terminal, the charging apparatus including a casing, a terminal mounting board disposed on the casing, a power cord connectable to an external power source, a guide groove formed on the terminal mounting board, and a charging terminal. The charging terminal includes a body having a first support member to be inserted into the guide groove, a second support member extending from the first support member to protrude from the terminal mounting board, a head movably coupled to the second support member of the body, and a contact plate mounted on a portion of the head and electrically connected to the power.

The foregoing and/or other aspects of the present invention may also be achieved by providing a charging apparatus used with a mobile robot including a rechargeable battery and a plurality of contact terminals, the charging apparatus including a charging unit having a plurality of charging terminals disposed to contact corresponding ones of the contact terminals to supply a charging current to the rechargeable battery of the mobile robot. Each of the charging terminals includes a body having a conductive material electrically connected to an external power source, and a head movably coupled to the body and having a contact plate mounted on a predetermined portion of the head and electrically connected to the conductive material to be brought into electrical contact with a corresponding one of the contact terminals of the mobile robot.

According to another aspect of the present invention, respective heads of the charging terminals are bent with respect to corresponding ones of bodies of the charging terminals in different directions when the contact terminals of the mobile robot contact corresponding ones of the charging terminals of the charging unit in a direction having an angle with a direction disposed on a line passing through a center of the mobile robot and a center portion of the charging terminals.

According to another aspect of the present invention, the contact terminals are disposed in a circular direction about a center of the mobile robot, the charging terminals comprise first and second charging terminals having a first body with a first head and a second body with a second head, respectively, the first head of the first charging terminal being disposed on a line having a first distance with a center thereof passing through the center of the mobile robot and a center portion of the charging terminals moves in a first direction with respect to the first body of the first charging terminal, and the second head of the second charging terminal being disposed on a line having a second distance with a center thereof passing through the center of the mobile robot and a center portion of the terminals moves in a second direction with respect to the second body of the second charging terminal.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout. The embodiments are described below in order to explain the present invention by referring to the figures.

Figure 1:
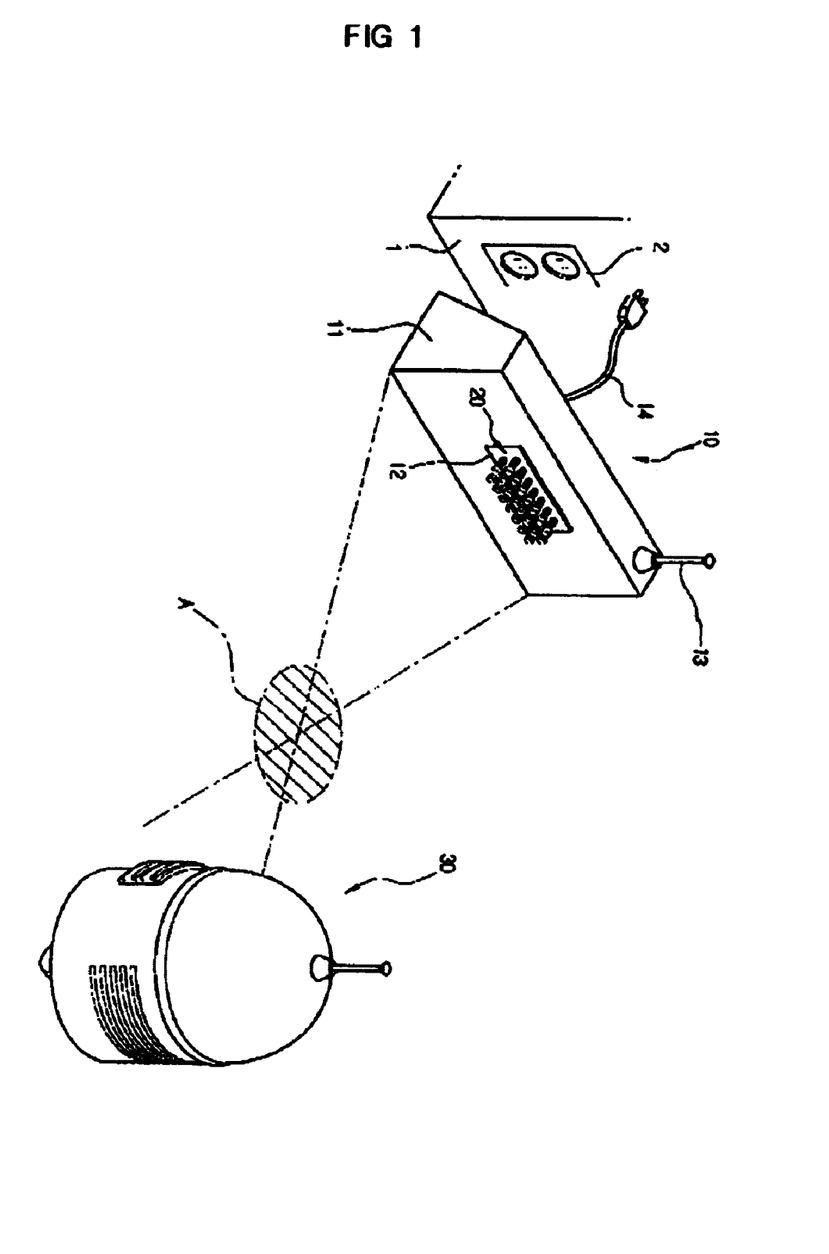
FIG. 1 is a perspective view of a charging apparatus used with a mobile robot, according to an embodiment of the present invention.
Figure 2:
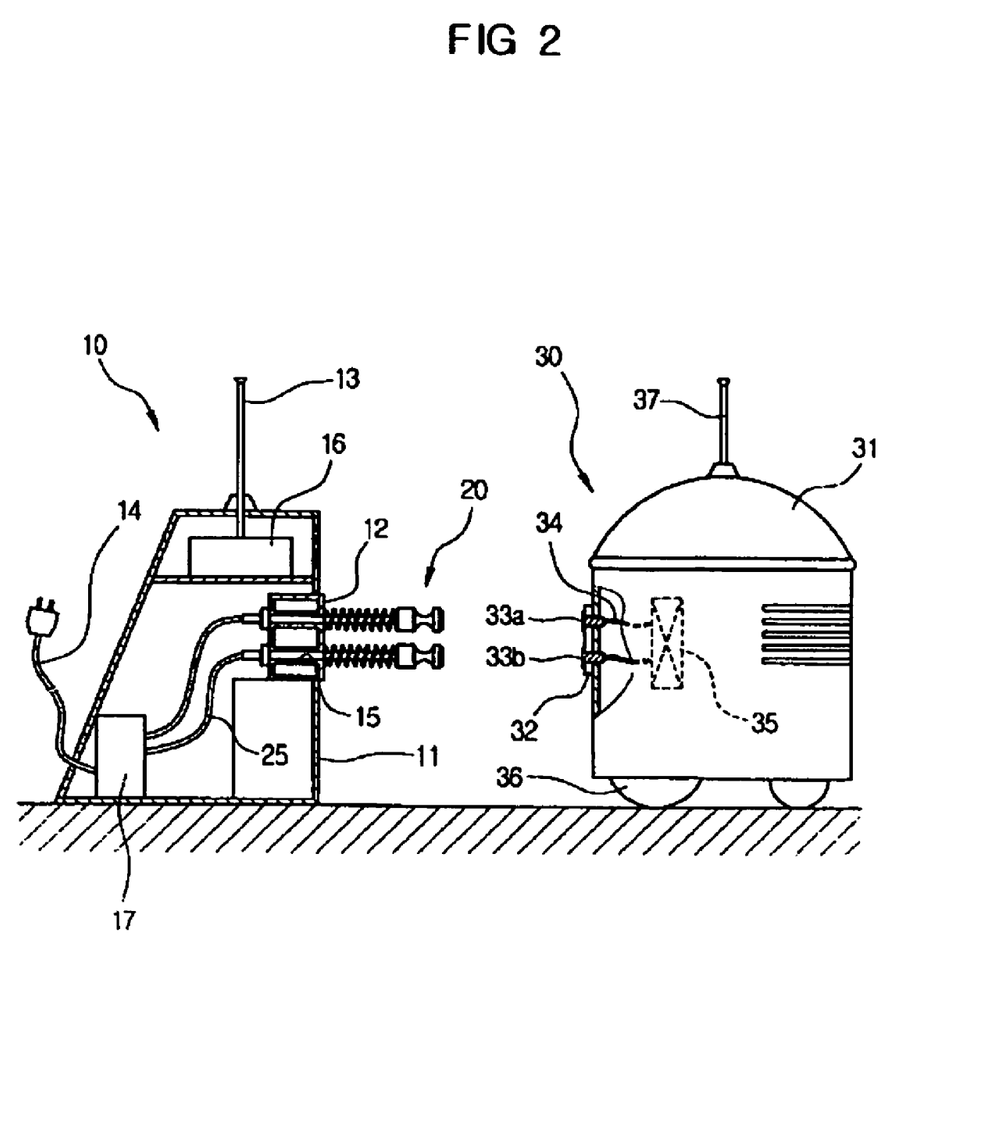
FIG. 2 is a view showing the mobile robot which moves to be in contact with charging terminals of the charging apparatus of FIG. 1.

FIG. 1 is a perspective view of a charging apparatus used with a mobile robot 30 according to an embodiment of the present invention. FIG. 2 is a view showing the mobile robot 30 which approaches a charging unit 10 included in the charging apparatus of FIG. 1.

As shown in FIG. 1, the charging apparatus used with the mobile robot 30 according to the present invention includes the charging unit 10 and the mobile robot 30.

The charging unit 10 includes a casing 11, a first terminal mounting board 12 provided on an outer surface of the casing 11, and a plurality of charging terminals 20 mounted thereon. A first antenna 13 is provided on an upper surface of the casing 11 to transceive signals with the mobile robot 30. Further, the charging unit 10 includes a power cord 14 having a plug to connect the charging unit 10 to an outlet 2 which is provided on a wall 1.

The charging terminals 20 are provided on the first terminal mounting board 12.

The charging terminals 20 are arranged in a plurality of rows to be placed together within a predetermined range, and are movable with respect to the charging unit 10 by an external force.

When it is required to charge the mobile robot 30 during an operation of the mobile robot 30 within a scope of its activity, the mobile robot 30 moves to a predetermined reference position A in response to a signal which is transmitted from the charging unit 10 through the first antenna 13. Thereafter, the mobile robot 30 moves from the predetermined reference position A to the first terminal mounting board 12 so as to be in contact with the first terminal mounting board 12.

Referring to FIG. 2, the mobile robot 30 includes a robot body 31 and a second terminal mounting board 32 provided on an outer surface of the robot body 31. First and second contact terminals 33a and 33b are mounted to the second terminal mounting board 32. The first and second contact terminals 33a and 33b are electrically connected to a rechargeable battery 35 via an electric cable 34.

Wheels 36, which are mounted to a bottom of the robot body 31, are driven by a wheel drive motor (not shown). The wheel drive motor is driven by electricity which is supplied from the rechargeable battery 35 in response to a control signal transmitted from a robot control unit (not shown). The control signal may be received through a second antenna 37.

The first terminal mounting board 12 of the charging unit 10 is mounted to a position corresponding to the second terminal mounting board 32 having the first and second contact terminals 33a and 33b of the mobile robot 30. A guide groove 15 is arranged in upper and lower portions of the first terminal mounting board 12.

The reference numeral 16 denotes a control circuit box in which a control circuit is installed to control an operation of the charging unit 10, including the operation of transceiving signals with the mobile robot 30. The reference numeral 17 denotes a charging circuit box in which a charging circuit is installed to generate a charging current using an external electricity supplied through the outlet 2 and the power cord 14, and the charging current is outputted to the charging terminals 20 through an electric cable 25.

Figure 3:
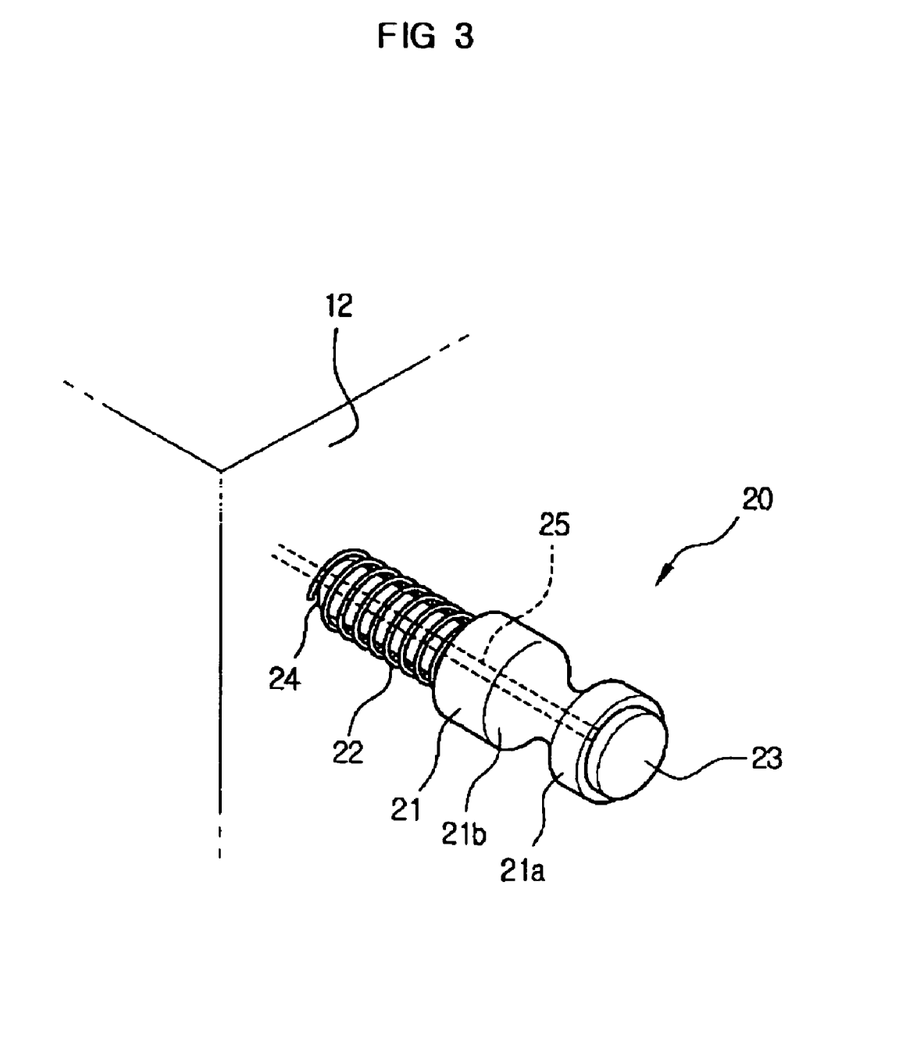
FIG. 3 is an enlarged perspective view of one of the charging terminals of FIG. 2.

As shown in FIG. 3, according to this embodiment of the present invention, each of the plurality of charging terminals 20 includes a body 21, a support shaft 24 to support the body 21, a restoring spring 22, and a contact plate 23.

A groove 21b is formed on a predetermined portion of the body 21, and a head 21a extends from the groove 21b. The contact plate 23 is mounted on a predetermined portion of the head 21a. Because the body 21 is made of a flexible insulating material, the head 21a is movable when the external force is applied to the head 21a. The contact plate 23 is made of copper.

The electric cable 25 is embedded in the support shaft 24 and the body 21, and an end of the electric cable 25 is electrically connected to the contact plate 23. The contact plate 23 is in surface contact with a corresponding one of the first and second contact terminals 33a and 33b of the mobile robot 30.

When the contact plate 23 is pressed by the corresponding one of the first and second contact terminals 33a and 33b, the restoring spring 22 which is coupled to the body 21 is compressed, and the support shaft 24 enters the guide groove 15 of the first terminal mounting board 12. In a case where the contact plate 23 is straightly pressed, the head 21a moves backward and the support shaft 24 is deeply inserted into the guide groove 15. Meanwhile, in a case where the contact plate 23 is obliquely pressed, the head 21a is bent while moving backward, and the support shaft 24 is inserted to a lesser extent into the guide groove 15 as compared with the above-mentioned case of the contact plate 23 being straightly pressed.

When the contact plate 23 is released from the corresponding one of the first and second contact terminals 33a and 33b, the body 21 is returned to an original position thereof by the restoring spring 22.

Figure 4:
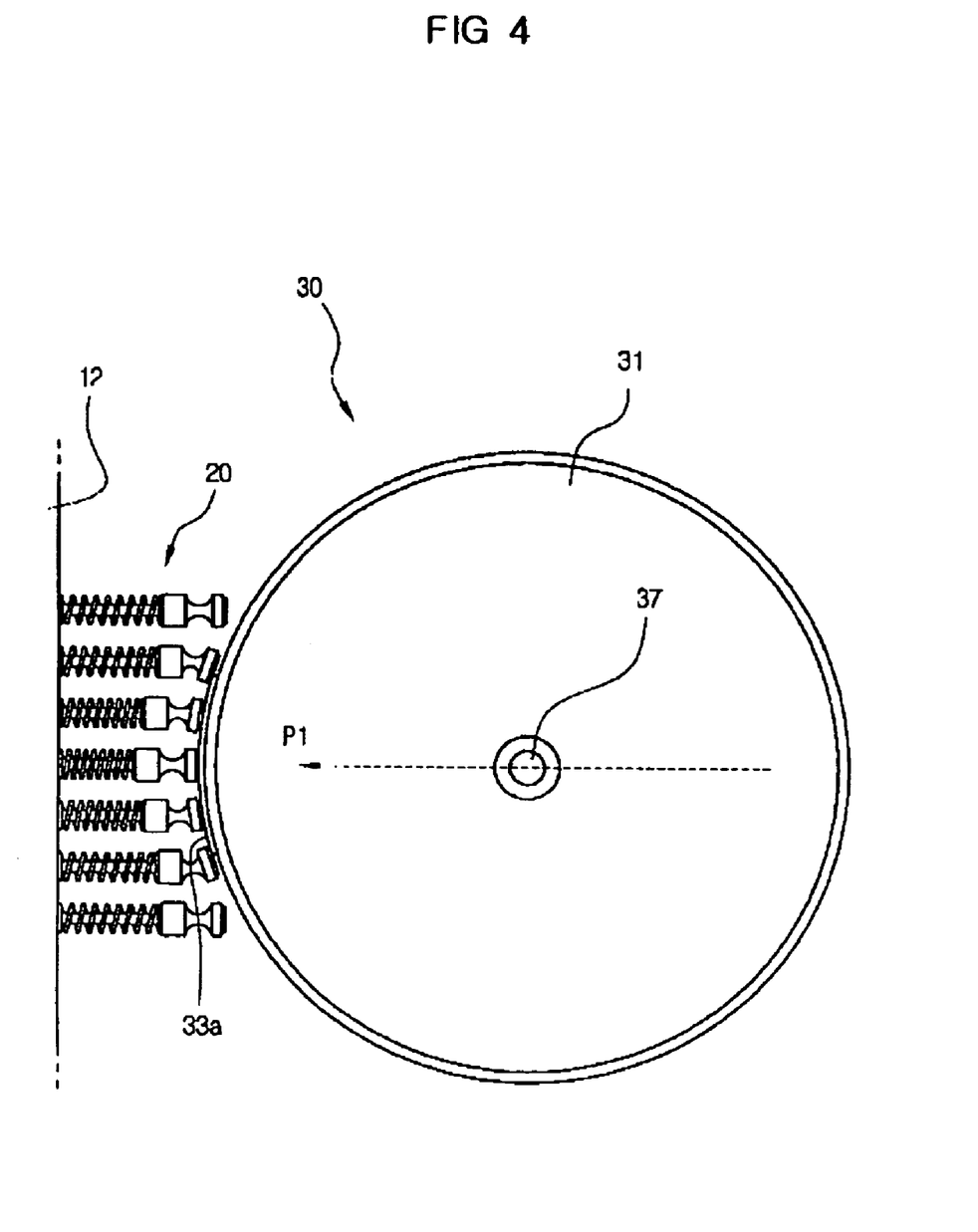
FIG. 4 is a sectional view showing the mobile robot which contacts the charging terminals in a straight direction.

As shown in FIG. 4, when the mobile robot 30 approaches the first terminal mounting board 12 of the charging unit 10 in a straight direction P1, most of the charging terminals 20, which are arranged on the upper portion of the terminal mounting board 12, are brought into electrical contact with corresponding ones of the first contact terminals 33a which are provided on the upper portion of the second terminal mounting board 32. Further, although not shown in FIG. 4, most of the charging terminals 20, which are arranged on the lower portion of the terminal mounting board 12, are brought into electrical contact with corresponding ones of the second contact terminals 33b which are provided on the lower portion of the second terminal mounting board 32.

Figure 5:
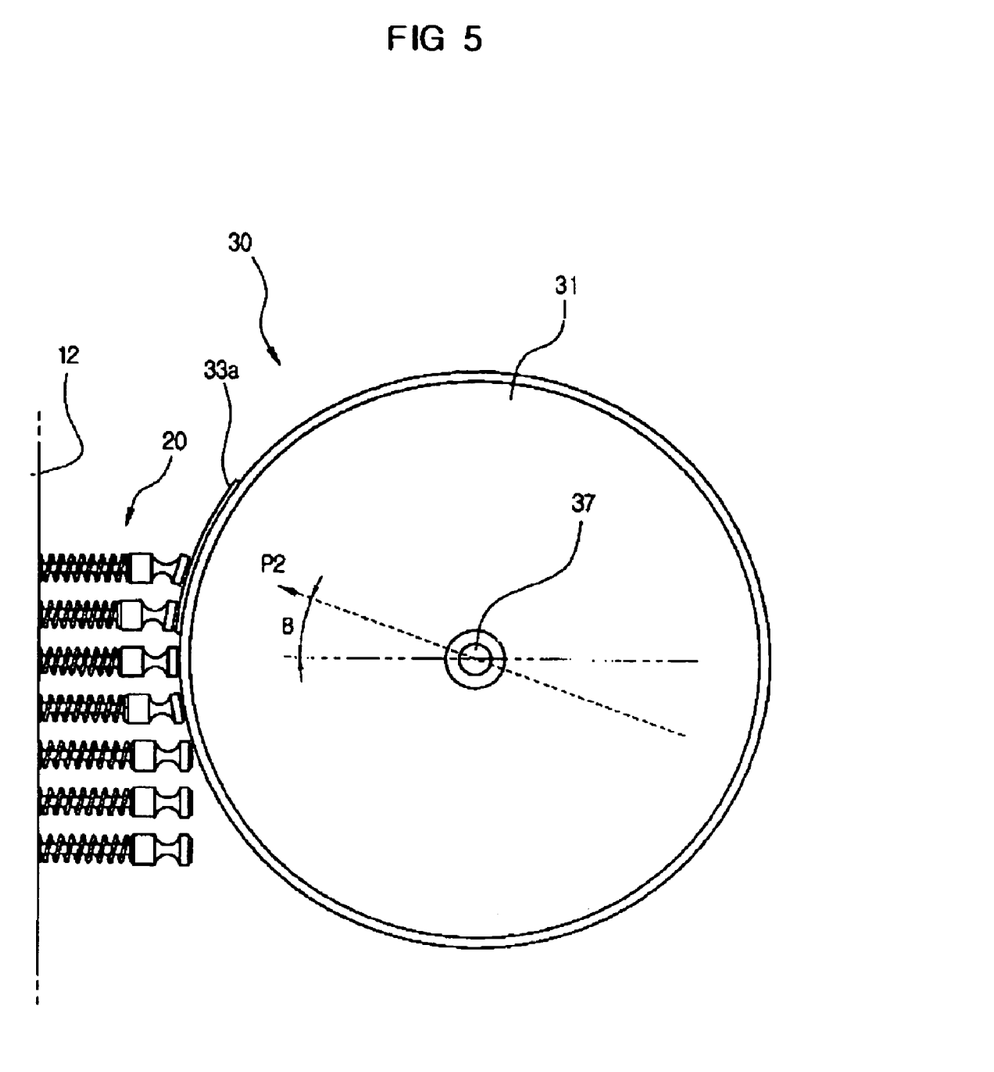
FIG. 5 is a sectional view showing the mobile robot which obliquely contacts the charging terminals.

When the mobile robot 30 approaches the charging unit 10 to be in contact with the charging unit 10, a position error may occur due to obstacles disposed on a support surface between the mobile robot 30 and the charging unit 10, or friction between the wheels 36 and the support surface. As shown in FIG. 5, when the mobile robot 30 approaches the first terminal mounting board 12 of the charging unit 10 in a direction P2 having an angle B with the straight direction P, some of the charging terminals 20, which are arranged on the upper portion of the first terminal mounting board 12, are brought into electrical contact with corresponding ones of the first contact terminals 33a provided on the upper portion of the first terminal mounting board 32. Further, although not shown in FIG. 5, some of the charging terminals 20, which are arranged on the lower portion of the first terminal mounting board 12, are brought into electrical contact with corresponding ones of the second contact terminals 33b provided on the lower portion of the terminal mounting board 32. Thus, even when a small position error occurs, the mobile robot 30 can be brought into effective electrical contact with the charging unit 10.

When at least one charging terminal 20 is brought into electrical contact with the first contact terminal 33a and at least one charging terminal 20 is brought into electrical contact with the second contact terminal 33b, the charging current flows through the electric cables 25 and 34, so that the rechargeable battery 35 of the mobile robot 30 starts to be recharged. When the electricity of the rechargeable battery 35 reaches a preset level, the mobile robot 30 retreats from the charging unit 10 to be electrically disconnected from the charging unit 10, thereby stopping the charging operation.

Each of the charging terminals 20 according to this embodiment of the present invention is constructed so that the head 21a extends from the body 21.

The structure to couple a head to a body of each of charging terminals may be changed without departing from the principles and spirit of the invention. Charging terminals according to other embodiments will be described hereinafter with reference to FIGS. 6–8. The charging terminals according to the other embodiments have the same function as the charging terminals of FIG. 3.

Figure 6:
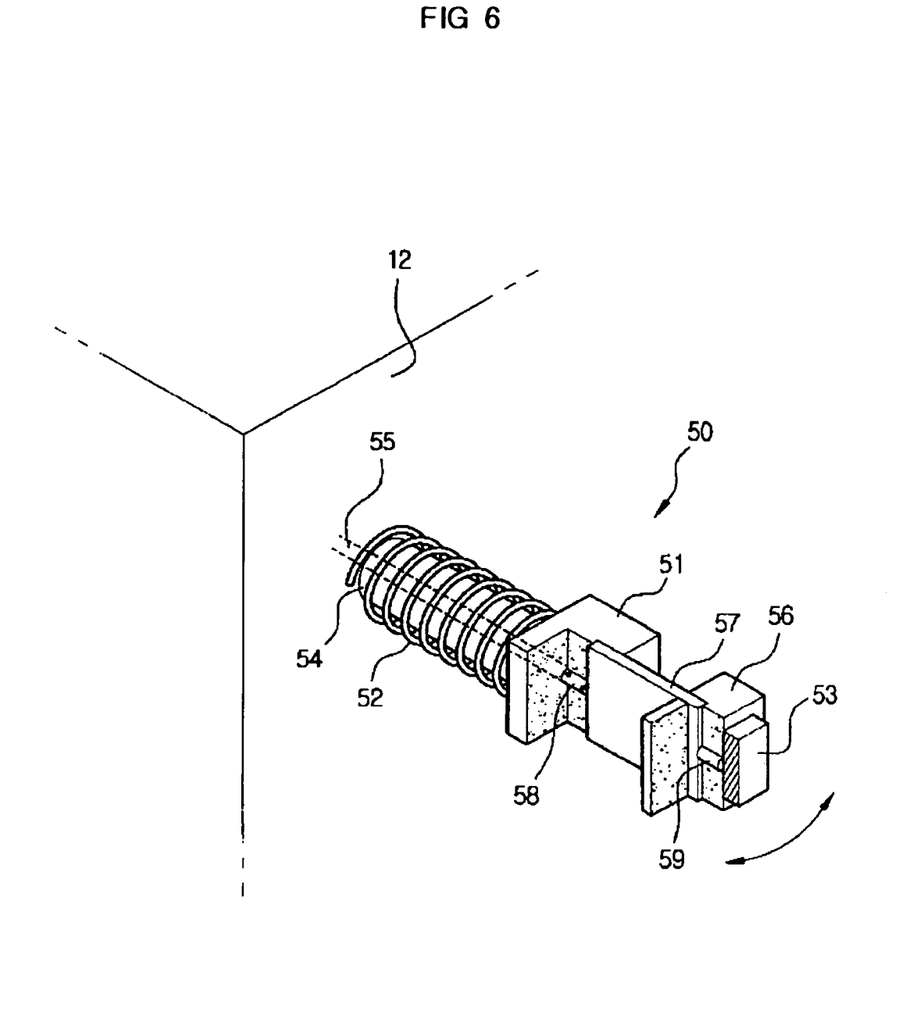
FIG. 6 is a perspective view of a charging terminal included in a charging apparatus used with a mobile robot, according to another embodiment of the present invention.

As shown in FIG. 6, each of charging terminals 50 according to another embodiment of the present invention includes a body 51, a support shaft 54 to support the body 51, a restoring spring 52, and a contact plate 53.

In each charging terminal 50, the body 51 is separated from the head 56. The body 51 is coupled to the head 56 by a coupling plate 57. The body 51 and the head 56 are insulators.

Because the coupling plate 57 is made of a thin metal plate, the head 56 is movable when the external force is applied to the head 56, which is coupled to the coupling plate 57.

The contact plate 53 is mounted on a predetermined portion of the head 56 and is made of copper.

An electric cable 55 is embedded in the support shaft 54 and the body 51. An electric wire 58 of the embedded electric cable 55 is electrically connected to a first end of the coupling plate 57. Further, a second end of the coupling plate 57 is electrically connected to the contact plate 53 via a metal piece 59.

When the contact plate 53 is pressed by a corresponding one of the first and second contact terminals 33a and 33b of the mobile robot 30, the restoring spring 52 which is connected to the body 51 is compressed, and then the support shaft 54 enters the guide groove 15 of the first terminal mounting board 12. Meanwhile, when the contact plate 53 is released from the corresponding one of the first and second contact terminals 33a and 33b, the body 51 is returned to an original position thereof by the restoring spring 52.

Figure 7:
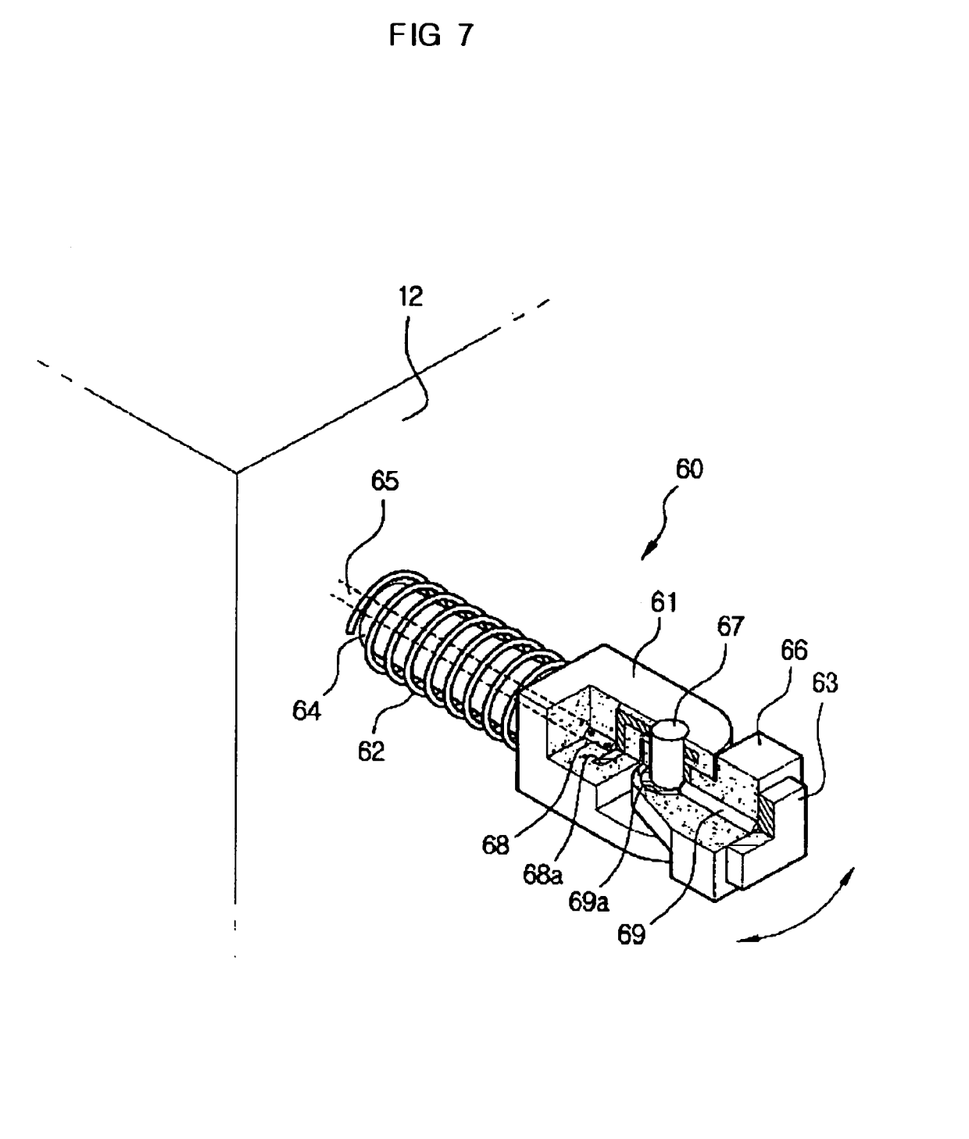
FIG. 7 is a perspective view of a charging terminal included in a charging apparatus for mobile robots according to another embodiment of the present invention.

As shown in FIG. 7, each of charging terminals 60 according to another embodiment of the present invention includes a body 61, a support shaft 64 to support the body 61, a restoring spring 62, and a contact plate 63.

In each charging terminal 60, the body 61 is coupled to a head 66 by a metal pin 67. When the external force is applied to the head 66 which is coupled to the metal pin 67, the head 66 is movable. The body 61 and the head 66 are insulators.

The contact plate 63 is mounted on a predetermined portion of the head 66. The contact plate 63 is made of copper.

An electric cable 65 is embedded in the support shaft 64 and the body 61. An electric wire 68 of the embedded electric cable 65 is electrically connected to a first end of the metal pin 67 via a bent piece 68a which is made of metal. Further, a second end of the metal pin 67 is electrically connected to a metal bush 69a which is embedded in the head 66. The metal bush 69a is electrically connected to the contact plate 63 by a metal piece 69.

When the contact plate 63 is pressed by the corresponding one of the first and second contact terminals 33a and 33b of the mobile robot 30, the restoring spring 62 which is connected to the body 61 is compressed, and the support shaft 64 enters the guide groove 15 of the first terminal mounting board 12. Meanwhile, when the contact plate 63 is released from the corresponding one of the first and second contact terminals 33a and 33b, the body 61 is returned to an original position thereof by the restoring spring 62.

Figure 8:
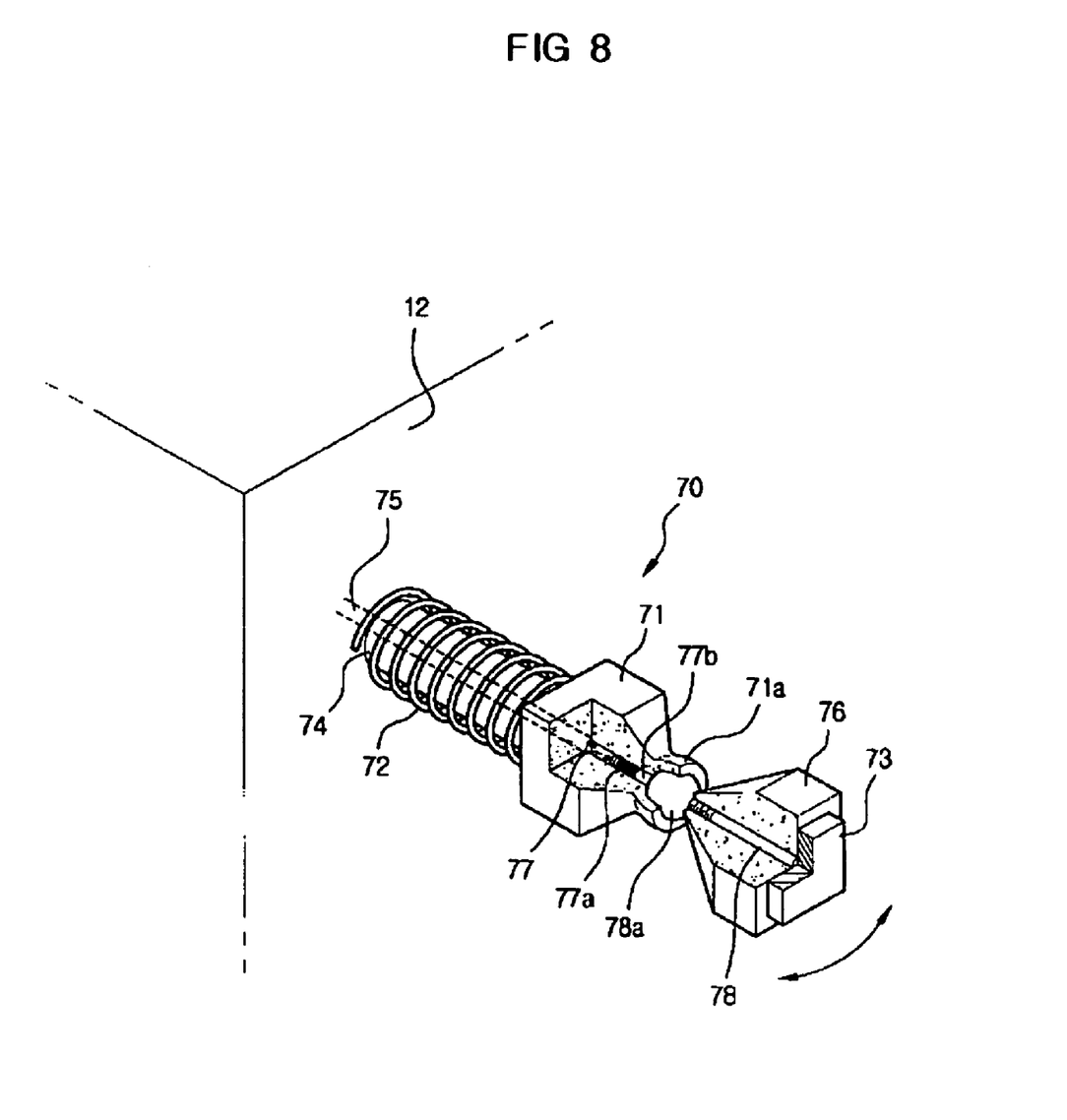
FIG. 8 is a perspective view of a charging terminal included in a charging apparatus for mobile robots according to another embodiment of the present invention.

Referring to FIG. 8, each of charging terminals 70 according to another embodiment of the present invention includes a body 71, a support shaft 74 to support the body 71, a restoring spring 72, and a contact plate 73. In each charging terminal 70, the body 71 is coupled to a head 76 by a coupling rod 78. The coupling rod 78 is made of metal, and has a ball 78a at one end thereof. The coupling rod 78 is fastened to the head 76 through a screw-type fastening method. A socket 71a is provided at a position of the body 71, and the ball 78a is rotatably set in the socket 71a. When the external force is applied to the head 76 which is coupled to the coupling rod 78, the head 76 is movable. The body 71 and the head 76 are insulators.

The contact plate 73 is mounted to a predetermined portion of the head 76 and is made of copper.

An electric cable 75 is embedded in the support shaft 74 and the body 71. An electric wire 77 of the embedded electric cable 75 is electrically connected to a conductive spring 77a and a metal piece 77b. The conductive spring 77a makes the metal piece 77b be in close contact with the ball 78a. The metal piece 77b is electrically connected to the contact plate 73 via the coupling rod 78.

When the contact plate 73 is pressed by a corresponding one of the first and second contact terminals 33a and 33b of the mobile robot 30, the restoring spring 72 which is connected to the body 71 is compressed, and the support shaft 74 enters the guide groove 15 of the terminal mounting board 12. Meanwhile, when the contact plate 73 is released from the corresponding one of the first and second contact terminals 33a and 33b, the body 71 is returned to an original position thereof by the restoring spring 72.

As is apparent from the above description, the present invention provides a charging apparatus used with a mobile robot, which is constructed such that a plurality of charging terminals are arranged on predetermined portions of a charging unit, and each head of the charging terminals is movable, thus allowing the mobile robot to be easily and rapidly brought into electrical contact with the charging unit. Further, the charging apparatus used with the mobile robot, according to the embodiments of the present invention, does not need an expensive guide unit to prevent a charging failure, thereby reducing manufacturing costs.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A charging apparatus used with a mobile robot, comprising:
   a rechargeable battery and a contact terminal included in the mobile robot; and
   a charging unit including a plurality of charging terminals at least one of which is brought into electrical contact with the contact terminal of the mobile robot to supply a charging current to the rechargeable battery of the mobile robot, each of the charging terminals comprising,
   a body comprising an insulating material, and
   a head movably coupled to the body, and having a contact plate mounted on a predetermined portion of the head to be brought into electrical contact with the contact terminal of the mobile robot.

2. The charging apparatus according to claim 1, wherein the plurality of charging terminals are arranged in a plurality of rows.

3. The charging apparatus according to claim 1, wherein each of the charging terminals further comprises:
   a support shaft to support the body; and
   an elastic member to restore the body to an original position thereof.

4. The charging apparatus according to claim 1, wherein the body comprises a groove, and the head extends from the groove to be integrated with the body in a single structure.

5. The charging apparatus according to claim 1, wherein the charging unit comprises an electrical cable coupled to an external power source, and each of the charging terminal comprises an electrical connecting member embedded in the body and the head to electrically connect the contact plate to the electrical cable.

6. The charging apparatus according to claim 1, wherein each of the charging terminals comprises a coupling unit to couple the body to the head.

7. The charging apparatus according to claim 6, wherein the coupling unit comprises a metal plate.

8. The charging apparatus according to claim 6, wherein the coupling unit comprises a metal pin.

9. The charging apparatus according to claim 6, wherein the coupling unit comprises a coupling rod which has a ball at an end thereof.

10. A charging apparatus used with a mobile robot having a rechargeable battery and a contact terminal, comprising:
    a casing;
    a terminal mounting board disposed on the casing;
    a charging circuit connectable to an external power source;
    a guide groove formed on the terminal mounting board; and
    a charging terminal comprising,
    a body having a first support member to be inserted into the guide groove, and having a second support member extending from the first support member to protrude from the terminal mounting board, and
    a head movably coupled to the second support member of the body, and having a contact plate mounted on a portion of the head and electrically connected to the charging circuit.

11. The charging apparatus according to claim 10, wherein the charging terminal further comprises:
    a groove portion formed on the second support member between the portion of the head and the first support member.

12. The charging apparatus according to claim 11, wherein the first support member moves in a direction parallel to the guide groove, and the groove portion of the second support member has an area perpendicular to the direction parallel to the guide groove, the area being smaller than at least one of an area of the portion of the head and an area of the second support member.

13. The charging apparatus according to claim 12, wherein the area of the groove portion of the second support member is smaller than an area of the first support member.

14. The charging apparatus according to claim 10, wherein the charging terminal further comprises:
    an elastic member disposed between the terminal mounting board and the body of the charging terminal so that the first support member slides along the guide groove of the terminal mounting board.

15. The charging apparatus according to claim 10, wherein the first support member, the second support member, and the head are formed in a monolithic single body.

16. The charging apparatus according to claim 10, wherein the body comprises:
a through hole formed to pass through the body from the first support member to the portion of the head; and
an electrical cable disposed in the through hole to be electrically connected to the contact plate and the power code.

17. The charging apparatus according to claim 10, wherein the first support member of the body moves in a first direction while the head moves in a second direction.

18. The charging apparatus according to claim 10, wherein the first support member moves in a first direction along the guide groove, and the head moves in a second direction different from the first direction when the contact terminal of the robot moves toward the contact plate in a third direction different from the first and second directions.

19. The charging apparatus according to claim 10, wherein the first support member of the body and the head moves in different directions with respect to the terminal mounting board and the body, respectively, when the contact terminal of the robot is not disposed on a line passing through the guide groove and a center of the robot.

20. The charging apparatus according to claim 10, wherein the charging terminal comprises:
a coupling member coupled between the second support member of the body and the head so that the head elastically moves with respect to the body.

21. The charging apparatus according to claim 20, wherein the charging terminal further comprises:
a through hole formed to pass through the first and second support members of the body;
an electrical cable disposed in the through hole to be electrically connected to the coupling member and the power code; and
another electrical cable connecting the contact plate and the coupling member.

22. The charging apparatus according to claim 10, wherein the charging terminal comprises:
a pin coupled between the second support member of the body and the head so that the head can move with respect to the second support member, and electrically connected between the power code and the contact plate.

23. The charging apparatus according to claim 22, wherein the charging terminal comprises:
a through hole formed to pass through the body from the first support member to a portion of the second support member;
an electrical cable disposed in the through hole to be electrically connected to the charging circuit;
an electric cable disposed on the second support member to connect the electric cable to the pin; and
a piece disposed on the head to connect the pin to the contact plate.

24. The charging apparatus according to claim 10, wherein the charging terminal comprises:
a socket formed on the second support member; and
a ball rotatably disposed in the socket and formed on the head.

25. The charging apparatus according to claim 24, wherein the charging terminal comprises:
a through hole formed to pass through the body from the first support member to a portion of the second support member;
an electrical cable disposed in the through hole to be electrically connected to the charging circuit and the contact plate; and
a conductive wire electrically connecting the electrical cable to the contact plate through the ball.

26. The charging apparatus according to claim 25, wherein the electrical wire comprises:
a metal piece disposed on the second support member to be connected to the electrical cable; and
a coupling rod disposed in the head to be electrically connected between the metal piece and the contact plate.

27. The charging apparatus according to claim 25, wherein the electrical wire comprises a hole formed in the ball such that the conductive wire passes through the hole to be electrically connected to the contact plate.

28. A charging apparatus used with a mobile robot, comprising:
a rechargeable battery and a plurality of contact terminals included in the mobile robot; and
a charging unit including a terminal mounting board having a guide groove, and a plurality of charging terminals disposed to contact corresponding ones of the contact terminals to supply a charging current to the rechargeable battery of the mobile robot, each of the charging terminals comprising,
a body having a conductive material having a first end moveably disposed in the guide groove to receive the charging current, and
a head movably coupled to the body, and having a contact plate mounted on a predetermined portion of the head and electrically connected to a second end of the conductive material to be brought into electrical contact with a corresponding one of the contact terminals of the mobile robot.

29. The charging apparatus according to claim 28, wherein respective heads of the charging terminals are bent with respect to corresponding ones of bodies of the charging terminals in different directions when the contact terminals of the mobile robot contact corresponding ones of the charging terminals of the charging unit in a direction having an angle with a direction disposed on a line passing through a center of the mobile robot and a center portion of the charging terminals.

30. The charging apparatus according to claim 28, wherein the contact terminals are disposed in a circular direction about a center of the mobile robot, the charging terminals comprise first and second charging terminals having a first body with a first head and a second body with a second head, respectively, the first head of the first charging terminal being disposed on a line having a first distance with a center thereof passing through the center of the mobile robot and a center portion of the charging terminals moves in a first direction with respect to the first body of the first charging terminal, and the second head of the second charging terminal being disposed on a line having a second distance with a center thereof passing through the center of the mobile robot and a center portion of the charging terminals moves in a second direction with respect to the second body of the second charging terminal.

* * * * *